Figure 1:
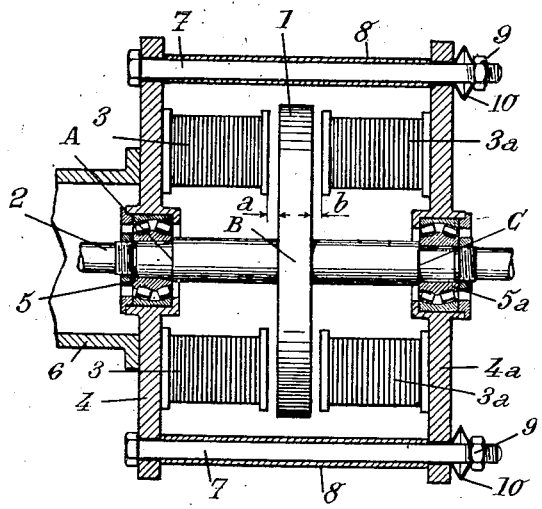

March 24, 1953 P. E. BESSIERE 2,632,859
ELECTRODYNAMIC BRAKE
Filed Oct. 5, 1951 3 Sheets-Sheet 1

INVENTOR
PIERRE ETIENNE BESSIERE
BY
ATTORNEYS

March 24, 1953 P. E. BESSIERE 2,632,859
ELECTRODYNAMIC BRAKE
Filed Oct. 5, 1951 3 Sheets-Sheet 2

INVENTOR
PIERRE ETIENNE BESSIERE
BY
Bailey, Stephens & Huettig
ATTORNEYS

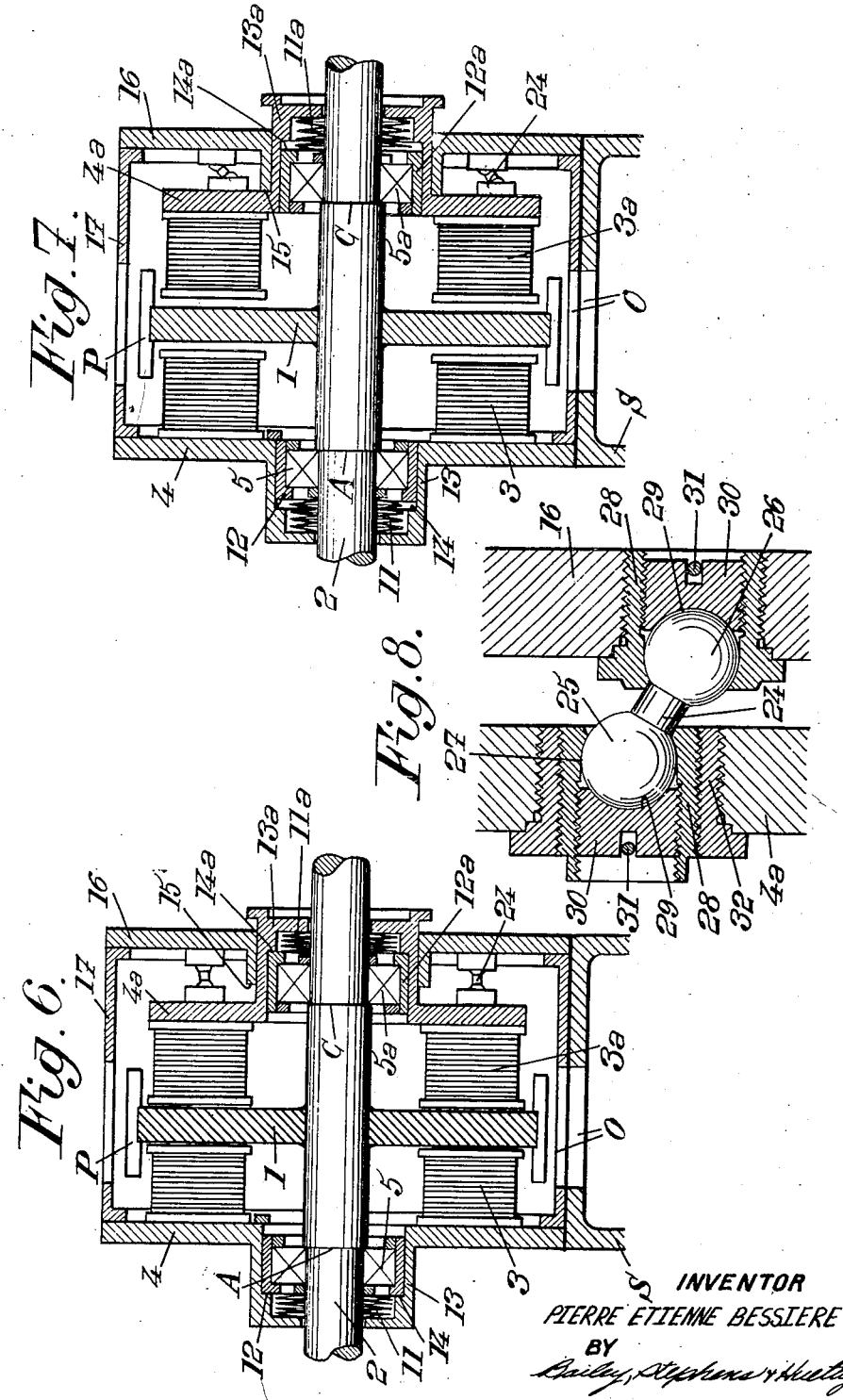

Patented Mar. 24, 1953

2,632,859

UNITED STATES PATENT OFFICE 2,632,859

ELECTRODYNAMIC BRAKE

Pierre Etienne Bessiere, Paris, France, assignor to Electro-Mecanique de l'Aveyron, S. A., Rodez, France, a society of France Application October 5, 1951, Serial No. 249,926
In France November 14, 1950

11 Claims. (Cl. 310—93)

The present invention relates to electrodynamic brakes, that is to say brakes including on the one hand a disc-shaped rotor made of a magnetic material mounted to turn together with the shaft to be braked and, on the other hand, pole pieces forming two groups disposed laterally with respect to the rotor on either side thereof, these pole pieces producing Foucault currents in the rotor when they are energized by an electric current and the rotor turns with respect thereto.

These Foucault currents not only determine a braking action upon the rotor but also develop therein heat which is to be taken off from the rotor through suitable cooling means.

The heating of the rotor, which is unavoidable despite the fact that it is cooled, involves a heating of the shaft on which the rotor is mounted. This heating causes an elongation of the shaft, which has been taken into account up to now by making one of the shaft bearings, on one of the sides of the rotor, in the form of a thrust bearing preventing any longitudinal displacement of the shaft with respect to the frame in which said bearing is housed. On the contrary, the other shaft bearing, disposed on the other side of the rotor, is arranged to permit a longitudinal sliding of the shaft with respect to the frame. This construction is intended to enable the shaft to elongate freely in one direction under the effect of the heating to which it is subjected. This one-sided elongation of the shaft produces a displacement of the rotor in the space provided between the two groups of pole pieces, the width of which space is practically non-variable. Due to this displacement, the rotor moves farther from one of the groups of pole pieces and closer to the other. Consequently, if in the cold state, the air gap between the rotor and each of the groups of pole pieces is the same, whereby the force of attraction is the same on both sides of the rotor respectively as long as the brake is cold, these forces become unequal when the brake is hot and the shaft which supports the rotor expands on one side. These unequalities between the forces of attraction cause, in known brakes, warping or other deformations of the rotor.

This drawback is avoided with the brake according to my invention. This brake is characterized in that the supports of the sets of pole pieces located on either side of the rotor are mounted in such manner that their distances to each other is variable in accordance with the variations of length undergone by the rotor shaft in response to temperature variations, and this in such manner as to keep equal to each other the respective air gaps on either side of the rotor, between said rotor and the pole pieces. This variation of the distance of the supports of the pole pieces is advantageously obtained by means of abutments disposed symmetrically on either side of the rotor and cooperating with the shaft thereof, so as to move away from each other when the shaft undergoes an elongation due to heating, and to move toward each other in the other case.

According to a preferred embodiment of the invention, the electro-dynamic brake is further arranged in such manner that the pole pieces can move toward the rotor under the action of the force of attraction existing between the rotor and said pole pieces, when they are energized, this movement toward each other being limited by abutments, and elastic means being provided to exert an antagonistic action in order to urge the pole pieces away from the rotor when said pole pieces are not energized.

Figure 2:
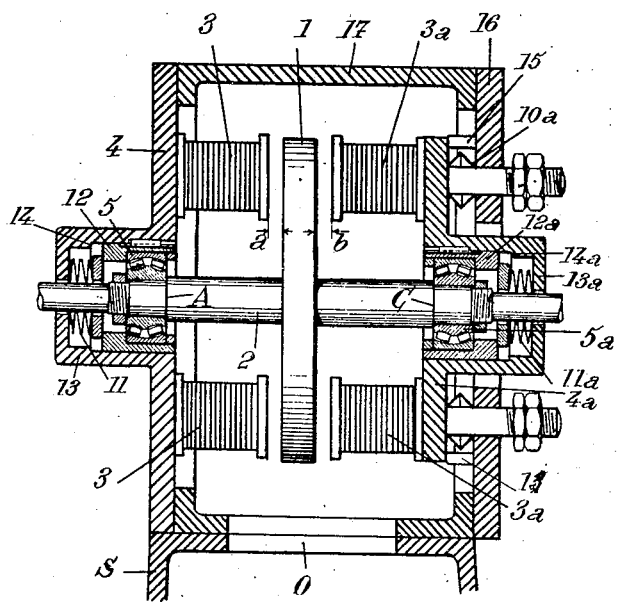
Figure 3:
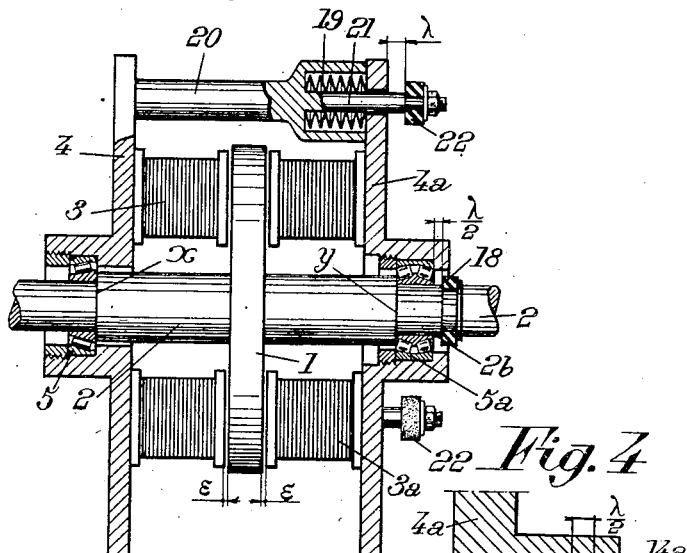
Figure 4:
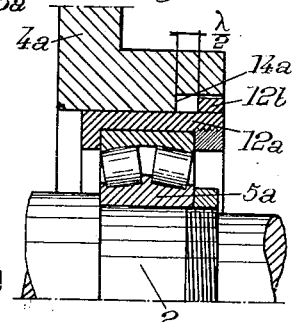

Preferred embodiments of my invention will be hereinafter described with reference to the accompanying drawings, given merely by way of example, and in which:

Figs. 1, 2, 3 and 5 diagrammatically show, in axial section, four electrodynamic brakes each of which is made according to an embodiment of the invention, Fig. 4 showing a modification of a detail of the construction of Fig. 3.

Figs. 6, 7 and 8 show a modification of the brake illustrated by Fig. 2.

The brake includes a disc-shaped rotor 1 made of a magnetic metal and mounted to rotate together with a shaft 2 to be braked. The rotor turns between two sets of pole pieces 3—3a which do not participate in the rotation movement of shaft 2 and rotor 3.

When pole pieces 3—3a are energized by an electric current, a magnetic flux is produced which creates, in rotor 1, Foucault or analogous currents which, closing through the rotor, both brake it and heat it.

The heat thus produced is taken off from the rotor through fan blades not shown on Figs. 1 to 5.

One of the sets of pole pieces, to wit 3, is fixed, for instance, to a metal plate 4, whereas the other group, 3a, is fixed to a plate 4a; these two plates belonging to the magnetic carcass of the brake and being consequently made of a magnetic metal such as iron or soft steel.

In these plates are also housed the bearings 5 and 5a of shaft 2.

The width of the interval between the sets 3 and 3a of pole pieces is not fixed but variable in accordance with the variations of length undergone by shaft 2 in response to its heating or cooling, this variation taking place in such manner that the air gaps a and b between rotor 1 and each of the sets of pole pieces 3 and 3a remain substantially equal to each other.

For this purpose, the brake is fitted with abutments disposed on either side of rotor 1 and cooperating with shaft 2 in such manner as to remain always symmetrical with respect to the median plane of rotor 1, whatever be the elongations or contractions of shaft 1. These abutments act upon the supports 4 and 4a of the pole pieces in such manner as to keep equal air gaps a and b to each other (see Figs. 1 and 2).

Said abutments may be constituted by shoulders A and C and by bearings 5 and 5a both arranged in the form of thrust bearings. In the brakes shown by Figs. 1, 2 and 5, one of these bearings, for instance bearing 5, is to be arranged in such manner as to constitute a thrust bearing in both directions. The other bearing 5a may also be a thrust bearing in both directions, but in some cases it might be sufficient to arrange it to have a thrust effect only in the direction toward the inside of the brake, that is to say toward rotor 1.

Consequently, if shaft 2, due to heating thereof, increases in length between the two shoulders A and B, both of the side plates 4 and 4a, due to the thrust effect of bearings 5 and 5a, are moved away from each other. In order to make allowance for variation of the distance between the two side plates without creating unnecessary or dangerous strains therein, only plate 4 is rigidly fixed directly to the frame of the structure, for instance to the frame of the vehicle on which the brake is fitted, and this, for instance, through a support 6, whereby the brake is overhung. Furthermore, the cross-bars 7 which connect plates 4 and 4a to each other are arranged in such manner as to enable plate 4 to move with a translatory motion in the direction of the axis of shaft 2. I might, for this purpose, give bars 7 a telescopic construction, but preferably plate 4a is left free to slide on the corresponding ends of these bars 7. Advantageously, these cross bars 7 carry interspacing sleeves 8 of a length corresponding to the distance determined by bearings 5 and 5a between the central portions of plates 4 and 4a when shaft 2 is cold. These sleeves are chiefly intended to reduce the action of the forces of attraction on bearings 5 and 5a as long as shaft 2 is not heated (see Fig. 1).

Advantageously, springs or other elastic devices are mounted on the free ends to cross bars 7, between the outer face of plate 4a and nuts 9 screwed on said ends of bars 7. These springs are for instance constituted by elastic washers 10 which are crushed when plate 4a is pushed outwardly due to an elongation of shaft 2.

The effect of these elastic elements 10 consists chiefly in avoiding unnecessary and noisome displacements of the periphery of plate 4a.

The operation of the brake above described and which is shown by Fig. 1 is as follows:

When, due to the feed of current to pole pieces 3 and 3a, the brake, and more especially the shaft 2 thereof, grows hot, this shaft undergoes an elongation which is practically the same between A and B and between B and C. Point B is located at mid-distance between A and C and in the plane of symmetry of rotor 1. Due to the thrust effect of bearings 5 and 5a, plate 4a is pushed outwardly to a distance which is twice the elongation of shaft 2 in each of its sections A—B and B—C. Air gaps a and b, which were equal to each other when the brake was cold, undergo the same increase and remain equal to each other. Consequently, the magnetic forces of attraction acting upon the two sides of the rotor remain substantially equal to each other and do not tend to warp it.

If, after the current flowing through the pole pieces is cut off, the whole of the brake cools down, bearing 5a, which in the construction of Fig. 1, is a thrust bearing acting in both directions, brings plate 4a into its initial position until this plate comes into contact with sleeves 8, the values of the air gaps a and b constantly remaining equal to each other.

If bearing 5a is a thrust bearing only in the direction toward the inside of the brake, the return of plate 4a is ensured by elastic elements 10 which, in this case, further have this effect in addition to that above mentioned.

If bearing 5a is effective as a thrust bearing in both directions, elastic elements 10 might be disposed on the inner side of plate 4a, as shown by Fig. 3, which enables them to relieve bearings 5a of a substantial portion of the stresses due to the magnetic force of attraction exerted on pole pieces 3a, and this even after expansion of shaft 2.

It should be noted that it is of course always of interest to give air gaps a and b, during the operation of the brake, a value as small as possible, in order to obtain, for a given energizing of the pole pieces, a magnetic flux as high as possible, which gives the brake, for a given weight and size, the maximum power. On the other hand, it is necessary to avoid any mechanical friction of the rotor disc against any of the pole pieces which would cause, not only an undesirable braking action, but also a quick wear and tear of the pole pieces.

As a matter of fact, this mechanical friction would not matter much if it took place only during operation of the brake, since at this time, on the one hand the braking effect due to this friction would be added to the electrical braking effect and, on the other hand, the wear and tear would not be important, in view of the fact that the periods during which the brake operates are very short as compared with those for which it is out of action.

In order to obtain minimum values of air gaps a and b during the operation of the brake, and higher values, capable of safely excluding the possibility of any friction of the rotor against either of the sets of pole pieces when the brake is out of action, according to a preferred embodiment, the pole pieces are mounted in such manner that they can move toward the rotor, under the action of the force of attraction existing between the rotor and the pole pieces, when an energizing current is flowing therethrough, this movement toward each other being limited by abutments, whereas the pole pieces are urged away from the rotor through elastic means exerting an antagonistic action, when the pole pieces cease to be energized.

It should be noted that the forces of attraction which are available to move the pole pieces toward the rotor, when the brake is being operated are very high (averaging from 1 to 3 tons) in the various constructions existing at the present time.

An electrodynamic brake corresponding to this embodiment of the invention is shown by Fig. 2. In this brake, springs 11 and 11a, each constituted, for instance, by several elastic washers, are interposed between each of the bearings 5 and 5a of shaft 2, which are both made in the form of double thrust bearings, and the corresponding plate 4 or 4a. Furthermore, each of the external sleeves 12—12a which surround bearings 5—5a and which are fixed with respect to these bearings in the direction of the axis of shaft 2, is capable of sliding axially with respect to cylindrical parts 13—13a carried by plates 4—4a and mounted on said sleeves 12—12a.

Finally, in order to limit the sliding of plates 4—4a on sleeves 12—12a toward rotor 1, shoulders or abutments 14—14a are provided inside cylindrical parts 13—13a, these shoulders being adapted to come into contact with the external edges of sleeves 12—12a.

The maximum spacing between the pole pieces and the rotor is determined by abutments 15 fixed to an annular wall 16 located on the external side of plate 4a. This wall 16 is rigidly fixed through pieces 17 with respect to plate 4.

Finally, plate 4a is also under the action of elastic elements 10a, for instance in the form of elastic washers interposed between the external face of side plate 4a and the inner face of annular wall 16.

The whole of carcass structure 4—16—17 rests upon a support S which is fixed to the frame of the machine to which the brake is fitted. Said carcass and said support are provided with airing orifices O.

The operation of the brake shown by Fig. 2 is as follows:

As long as the brake is out of action, springs 11 and 11a are strong enough to give air gaps $a$ and $b$ important values, while compressing the elastic elements 10a, which are intended chiefly to prevent play.

When current is caused to flow through the pole pieces, the force of attraction which acts upon the two groups of pole pieces reduces air gaps $a$ and $b$ to a very low value, determined by the application of shoulders 14—14a against the external edges of sleeves 12—12a, compressing elastic elements 11 and 11a and simultaneously relieving elastic elements 10a. The brake now works in the conditions above stated when describing the construction of Fig. 1. As a matter of fact, if now shaft 2 undergoes an elongation due to its being heated, this elongation, due to the abutment effect of elements 12—14 and 12a—14a and of bearings 5 and 5a, moves plates 4 and 4a away from each other and slightly increases air gaps $a$ and $b$, while leaving them equal to each other. As the value of the air gaps is very small at the beginning of the operation of the brake, these increased values are still relatively small, even after elongation of shaft 2. After the energizing current has been cut off and the force of attraction of the pole pieces has disappeared, springs 11—11a again give the air gaps values sufficiently great for avoiding any risk of friction of the rotor against the pole pieces as long as no energizing current is flowing through these pieces.

In the device shown by Fig. 3, the bearing 5 provided in side plate 4 is a simple thrust bearing, while bearing 5a is a double thrust bearing following in both directions the displacements of plate 4a. As shaft 2 is provided with a groove 2b wider than bearing 5a mounted thereon, it has, with respect to said bearing, an axial play equal to $$\frac{\lambda}{1}$$

A damping ring 18 serves to absorb the shocks which may occur when there are sudden movements of side plate 4a and bearing 5a with respect to shaft 2.

Plate 4a is subjected to the action of springs constituted each for instance by several elastic washers 19 urging plate 4a outwardly. These springs are mounted, for instance, on bars 20 disposed between plates 4 and 4a and the number of which is for instance equal to four or five. A single bar 20 is shown by Fig. 3.

A rod 21 rigid with every bar 20 extends through holes provided in plate 4a near the edge thereof and is provided, at its outer end, with an abutment 22 constituted, for instance, by a damping rubber element. This abutment limits the displacement of plate 4a in the outward direction to a value equal to $\lambda$.

The operation of the brake shown by Fig. 3 is as follows:

When an energizing current is caused to flow through pole pieces 3—3a, the plates 4—4a which carry these pieces are brought to the minimum distance from each other under the effect of the magnetic force of attraction of rotor 1, while compressing springs 19. Their inward movement is limited by the abutments constituted by bars 20, a slight play being provided between bearings 5 and 5a and the annular surfaces $x$ and $y$ of shaft 2 when the right hand edge of bars 20 is in contact with plate 4a, whereby detrimental shocks are avoided. The air gap between the rotor and each of the groups of pole pieces is then given its minimum value $\epsilon$. This value is the same on either side of the rotor. If, due to heating of shaft 2, this shaft expands between bearings 5 and 5a, after having taken up the above mentioned play, it pushed plates 4 and 4a outwardly, whereby the air gaps on either side of disc 1 increase, while remaining equal to each other, to assume values which however remain relatively small, in view of the possibility of giving $\epsilon$ a very small value. When the energizing current is cut off, the magnetic force of attraction disappears and springs 19 push plate 4a toward the right, which first applies bearing 5a against damping ring 18 and increases the air gap $\epsilon$ between disc 1 and the set of pole pieces 3a by an amount equal to $$\frac{\lambda}{2}$$

Once bearing 5a is applied against ring 18, the thrust of springs 19 drives not only plate 4a but also shaft 2 and disc 1 until plate 4a can no longer move due to its being applied against abutments 22. This movement of shaft 2 and disc 1 toward the right has increased the air gap $\epsilon$ between disc 1 and the set of pole pieces 3 by an amount equal to $$\frac{\lambda}{2}$$

Consequently, on either side of disc 1, the air gap is now $$\epsilon + \frac{\lambda}{2}$$

This value is great enough to prevent any friction of disc 1 against one of the sets of pole pieces.

Furthermore, the values of the two air gaps remain equal to each other.

Fig. 4 shows a modification according to which play $$\frac{\lambda}{2}$$

instead of being provided between the double thrust bearing 5a and shaft 2, is provided between said bearing and plate 4a. For this purpose, plate 4a is mounted slidable on a sleeve 12a which surrounds bearing 5a and can have no axial displacements with respect thereto. A shoulder 14a provided on plate 4a will be applied against an abutment 12b provided on sleeve 12a when plate 4a has moved, under the action of springs 19, a distance $$\frac{\lambda}{2}$$

with respect to sleeve 12a. Besides, the operation of the modification illustrated by Fig. 4 is the same as that above described with reference to Fig. 3.

Figure 5:
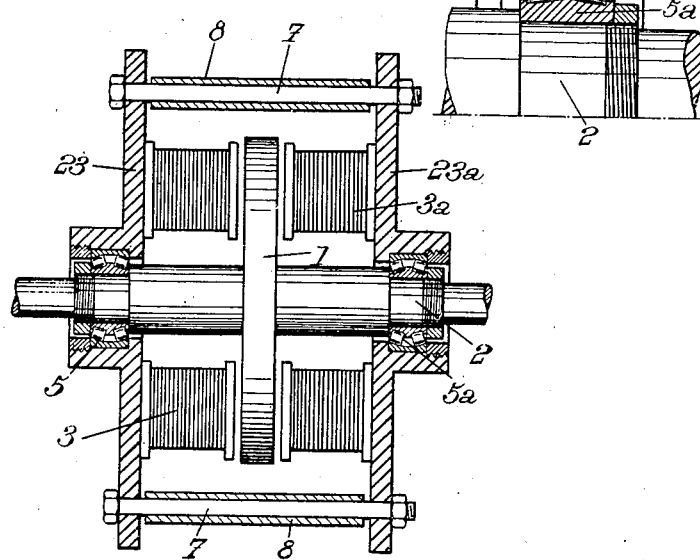

In the construction shown by Fig. 5, I make use of the elasticity of plates 23–23a themselves to obtain an increase of the air gap during the periods for which the pole pieces are not energized. In this construction, which is analogous to that shown by Fig. 1, one of the bearings, for instance bearing 5, provided in plate 23, is adapted to act as a thrust bearing in both directions, whereas bearing 5a, provided in plate 23a, may be either adapted to act as a thrust bearing only in the inward direction or adapted to act as a thrust bearing in both directions. Cross pieces 7 are fixed in the edge of plate 23, while the edge of plate 23a can slide on the ends of these cross pieces, which extend therethrough. On these cross pieces are mounted abutment sleeves 8. When current flows through the pole pieces to energize them, plates 23 and 23a, which are normally of plane shape, are slightly deformed into an umbrella-like shape under the effect of the magnetic force of attraction and they are applied, through their external edges, against the ends of sleeves 8. The air gap between disc 1 and each of the sets of pole pieces is thus given its minimum value, while remaining the same on either side of disc 1. If shaft 2 elongates between bearings 5 and 5a, plates 23 and 23a are deformed to a greater extent, but the values of the air gaps remain the same on either side of disc 1. When the energizing current is cut off, the plates return to their initial shape, which involves a considerable increase of the air gaps on either side of disc 1.

Of course the electric brake shown by Fig. 1 must be mounted on the machine to which it belongs in such manner that the elastic deformations of plates 23–23a can take place freely.

Figs. 6 to 8 show a modification of the electrodynamic brake illustrated by Fig. 2, Fig. 6 showing this modified brake when the pole pieces are energized, while Fig. 7 shows it when the pole pieces are at rest. In these figures, the elements which correspond to certain elements of Fig. 2 are designated by the same reference characters.

In a brake such as shown by Fig. 2, in order to keep the values of the air gaps on either side of rotor 1 always equal to each other, it is of course necessary to keep plate 4a constantly parallel to itself. This condition can be complied with by making this plate and its extension of dimensions sufficiently big. However, in some cases, this leads to the provision of a very heavy plate. In order to be able to reduce the mass of this plate, while keeping plate 4a and the wall 16 of the frame constantly parallel to each other, in the construction shown by Figs. 6 to 8, tangential rods or links 24 are interposed between plate 4a and said wall 16, these rods being pivoted respectively to said plate and to said wall and being capable of imparting to said plate, in the course of its sliding displacements with respect to wall 16, a slight angular displacement about its axis, the amplitude of this angular displacement depending upon the amplitude of the axial movement.

As a rule, it suffices to provide three links 24 pivoted at points located at the same distance from the axis of shaft 2, which is also the axis of the whole of the brake. Advantageously, these three links are disposed at the apexes of an equilateral triangle. However this condition is not necessary. It is also advantageous to dispose these links rather close to the circumference of plate 4a.

When the plate is in the position of Fig. 7, for which the distance between plate 4a and wall 16 is minimum, these links are very much inclined. They straighten up, while imposing to plate 4a, together with its extension 13a, a slight angular movement with respect to wall 16, when plate 4a moves away from wall 16, coming finally into the position shown by Fig. 6. If, now, plate 4a grows slightly closer to wall 16, due to an elongation of shaft 2, the direction of links 24 again changes, while imposing a small angular movement to plate 4a, so as to maintain this plate parallel to wall 16.

It should be noted that the length of these rods or links must be chosen such that, in no position whatever, the resultant of the forces which act thereon is in the direction of their longitudinal axes. In particular, care should be taken that, when the pole pieces are energized and in the position of Fig. 6, the angle made by the axis of each link with the normal to plate 4a which passes through the point of pivoting of said link on wall 16 is smaller than the angle made with this normal by the resultant of the force of attration and of the longitudinal reaction due to the braking torque.

The slight angular movement of pole pieces 3a has no disadvantage. On the other hand, the tangential reaction due to the braking torque creates, in each link, a longitudinal component which reduces the tangential reaction acting upon the ball bearings.

Concerning now the pivoting of the ends of links 24 respectively with plate 4a and wall 16, it is advantageously obtained as shown by Fig. 8. The ends of each link are constituted by spheres 25 and 26 held between a first spherical housing provided at one of the ends of a sleeve 28 provided with internal and external threads and a second spherical housing 29 provided in a threaded plug 30 screwed inside sleeve 28 where it is fixed by means of a pin 31. One of the sleeves 28 is screwed, through its external screw threads, directly in the corresponding element, for instance wall 16, while the other sleeve 28 is screwed in a second sleeve 32, also provided with internal and external threads and which is screwed in the other element, for instance plate 4a.

The electrodynamic brakes according to my invention may be used for braking any kind of movement, for instance that of a vehicle (truck, motor coach, etc.) of a crane, of a mining boring apparatus, and so on.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An electro-dynamic brake for slowing down a rotating part which comprises, in combination, a frame, a shaft coupled with said part rotatable with respect to said frame, a disc-shaped rotor made of a magnetic material rigid with said shaft, two sets of pole pieces disposed respectively on either side of said rotor laterally thereto so as to produce, when energized and the rotor is rotating, Foucault currents therein, two supports for said two sets of pole pieces respectively, said supports having each a fixed angular position about the axis of said shaft with respect to said frame and being slidable with a relative translatory motion parallel to said axis with respect to each other and to said rotor, and means for equally varying the distance between said rotor and each of said supports in response to expansions and retractions of said shaft caused by temperature variations, whereby the air gaps on the opposite sides of said rotor between said rotor and said pole pieces are kept constantly equal to each other.

2. An electro-dynamic brake for slowing down a rotating part which comprises, in combination, a frame, a shaft coupled with said part rotatable with respect to said frame, a disc-shaped rotor made of a magnetic material rigid with said shaft, two sets of pole pieces disposed respectively on either side of said rotor laterally thereto so as to produce, when energized and the rotor is rotating, Foucault currents therein, two supports for said two sets of pole pieces respectively, said supports having each a fixed angular position about the axis of said shaft with respect to said frame and being slidable with a relative translatory motion parallel to said axis with respect to each other and with respect to said rotor, cooperating abutments carried respectively by said shaft, symmetrically on either side of said rotor, and by each of said supports, for pushing said supports away from said rotor when said shaft expands and means for returning said supports inwardly when said shaft retracts.

3. An electro-dynamic brake for slowing down a rotating part which comprises, in combination, a frame, a shaft coupled with said part rotatable with respect to said frame, a disc-shaped rotor made of a magnetic material rigid with said shaft, two sets of pole pieces disposed respectively on either side of said rotor laterally thereto so as to produce, when energized and the rotor is rotating, Foucault currents therein, two supports for said two sets of pole pieces respectively, said supports having each a fixed angular position about the axis of said shaft with respect to said frame and being slidable with a relative translatory motion parallel to said axis with respect to each other and with respect to said rotor, cooperating abutments carried respectively by said shaft, symmetrically on either side of said rotor, and by each of said supports, for pushing said supports away from said rotor when said shaft expands and cooperating abutments carried respectively by said shaft symmetrically on either side of said rotor, and by each of said supports, for returning said supports inwardly when said shaft retracts.

4. An electro-dynamic brake for slowing down a rotating part which comprises, in combination, a frame, a shaft coupled with said part rotatable with respect to said frame, a disc-shaped rotor made of a magnetic material rigid with said shaft, two sets of pole pieces disposed respectively on either side of said rotor laterally thereto so as to produce, when energized and the rotor is rotating, Foucault currents therein, two supports for said two sets of pole pieces respectively, said supports having each a fixed angular position about the axis of said shaft with respect to said frame and being slidable with a relative translatory motion parallel to said axis with respect to each other and with respect to said rotor, cooperating abutments carried respectively by said shaft, symmetrically on either side of said rotor, and by each of said supports, for pushing said supports away from said rotor when said shaft expands and spring means for urging said supports toward each other.

5. A brake according to claim 2 in which said abutments consist of thrust bearings carried by said shaft and mounted in said supports.

6. A brake according to claim 2 further including cooperating abutment means carried by said supports for keeping a minimum distance between them.

7. A brake according to claim 2 further including, between said supports, interspacing elements the length of which is determined so that they absorb the action of the magnetic force of attraction between said rotor and said pole pieces as long as the brake is cold.

8. An electro-dynamic brake for slowing down a rotating part which comprises, in combination, a frame, a shaft coupled with said part rotatable with respect to said frame, a disc-shaped rotor made of a magnetic material rigid with said shaft, two sets of pole pieces disposed respectively on either side of said motor laterally thereto so as to produce, when energized and the rotor is rotating, Foucault currents therein, two supports for said two sets of pole pieces respectively, said supports having each a fixed angular position about the axis of said shaft with respect to said frame and being slidable with a relative translatory motion parallel to said axis with respect to said rotor, spring means, yieldable in response to the action of the magnetic force developed between said rotor and said pole pieces for urging said rotor and each of said supports away from each other, cooperating, abutments respectively carried by said shaft, symmetrically on either side of said rotor, and by each of said supports when said spring means have yielded for pushing said supports outwardly when said shaft expands, means for returning said supports toward said rotor when said shaft retracts, rigid abutments for limiting the movement of said supports toward said rotor in response to the action of said magnetic force.

9. A brake according to claim 8 in which said supports are constituted by elastic plates disposed on either side of the rotor.

10. A brake according to claim 2 in which at least one of said supports is slidable axially with respect to said frame.

11. A brake according to claim 10 further including, between said sliding support and said frame, tangential links pivoted respectively to said plate and to said frame and adapted to impart to said plate, during its sliding displacements, slight angular movements about its axis, the whole being arranged in such manner that the plate, in all its positions along its axis, remains exactly parallel with itself.

PIERRE ETIENNE BESSIERE.

REFERENCES CITED

The following references are of record in the file of this patent:

UNITED STATES PATENTS

| Number | Name | Date |
| --- | --- | --- |
| 2,503,704 | Bessiere | Apr. 11, 1950 |